Patented Mar. 13, 1923.

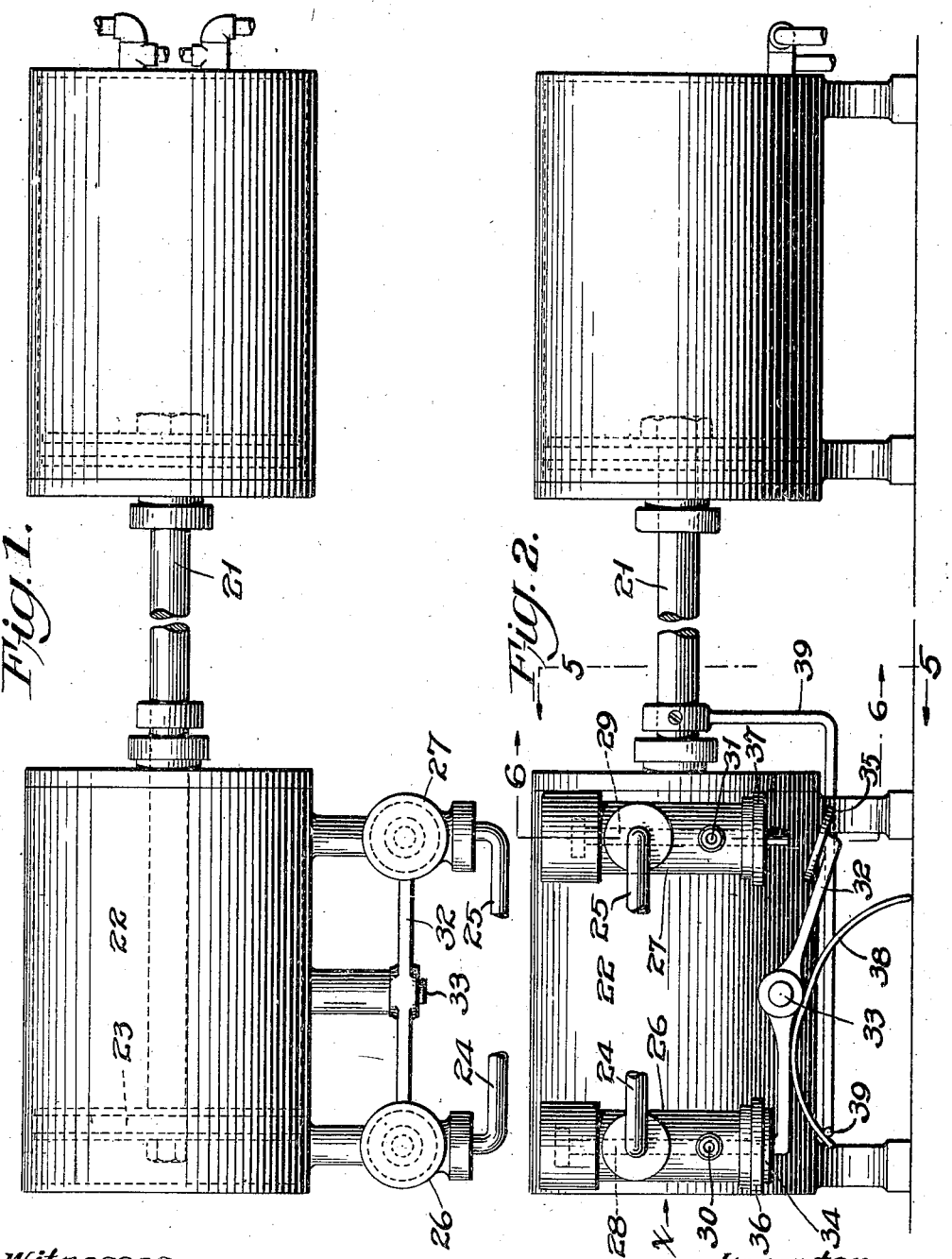

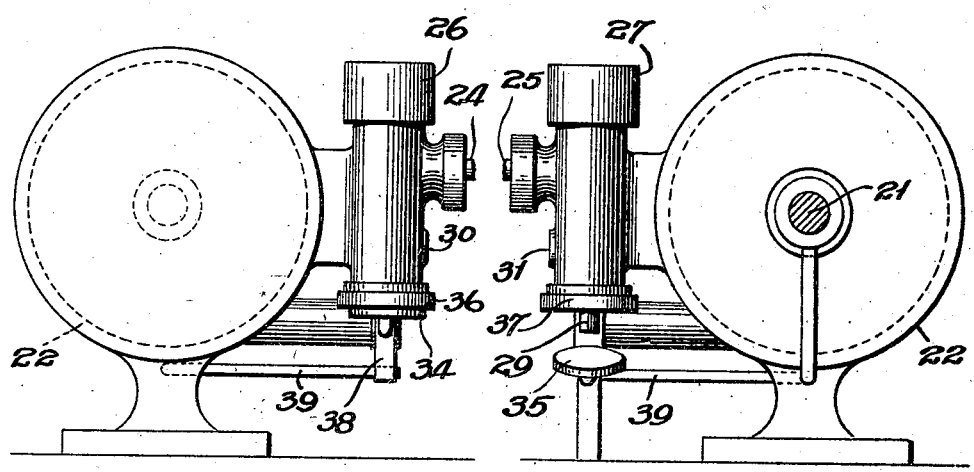
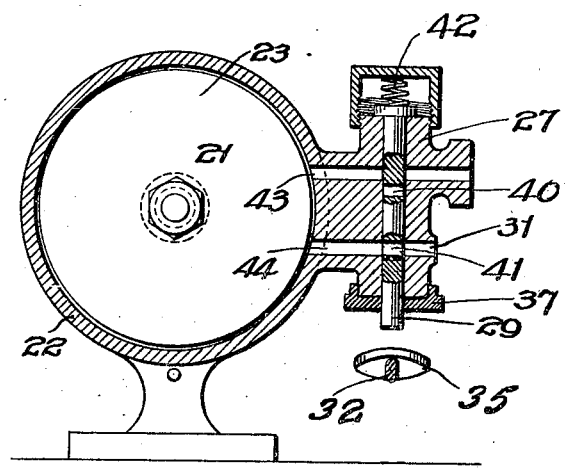

1,447,962

UNITED STATES PATENT OFFICE.

PATRICK H. CALLAGHAN, OF PHILADELPHIA, PENNSYLVANIA.

PUMPING MECHANISM.

Application filed December 10, 1919. Serial No. 343,708.

*To all whom it may concern:*

Be it known that I, PATRICK H. CALLAGHAN, a citizen of the United States, residing at Philadelphia, in the county of Philadelphia and State of Pennsylvania, have invented certain new and useful Improvements in Pumping Mechanism, of which the following is a specification.

One object of my invention is to provide an improved pumping mechanism which may be operated by air pressure and which is particularly well adapted to effect the pumping of lubricating oil to journal boxes and axle bearings on railroad cars or other vehicles so that the bearings will always be properly lubricated.

Another object is to so construct my invention that it can be operated by compressed air or other pressure fluid and will be positive in its action.

A still further object is to make my invention of a durable construction and so that it will require comparatively little attention.

These objects, and other advantageous ends which will be described hereinafter, I attain in the following manner, reference being had to the accompanying drawings in which Figure 1 is a top plan view of mechanism constructed in accordance with my invention, Figure 2 is a side elevation of Figure 1, Figure 3 is an end elevation of Figure 2 looking in the direction of the arrow *x*, Figure 4 is a section taken on the line 5—5 of Figure 2, and Figure 5 is a sectional elevation taken on the line 6—6 of Figure 2.

Referring to the drawings, a piston rod 21 extends into an air pressure cylinder 22; said air pressure cylinder having a piston 23 therein which is connected to the piston rod 21. Two pipes 24 and 25 for supplying compressed air, from any suitable source, to the cylinder 22, lead into valve casings 26 and 27 located at the side of the air pressure cylinder 22. These casings have rod valves 28 and 29 therein and are also provided with openings 30 and 31 for permitting the escape of air from the cylinder 22 as will hereinafter be described.

A two-arm lever 32 is pivoted between its ends at 33 and has permanently magnetized disks 34 and 35 on its opposite ends, as clearly shown in Figure 3. The bottoms of the valve casings 26 and 27 also have magnetic portions or disks 36 and 37 thereon adapted to co-act with the disks 34 and 35, so that the magnetic attraction of the disks will cause them to magnetically hold to the respective portions 36 and 37 of the valve casings when said disks are in their raised positions. The valve casings may be made of iron or steel and the disks, as illustrated, may be made of permanently magnetized steel. The lever 32 has an arcuate strip spring 38 secured thereto and the opposite end portions of said spring are bowed downwardly.

The piston rod 21 has an actuating bar 39 connected thereto which is operative during the reciprocation of the piston rod 21 to alternately engage the downwardly bowed portions of the spring 38 at opposite sides of a vertical center line passing through the pivot 33, the lower ends of the valve rods 28 and 29 normally extend below the bottoms of the casings 26 and 27 so that when the lever 32 is rocked due to the action of the bar 39, the valve rods will be alternately raised within the valve casings. Each of the valve rods has holes 40 and 41 extending therethrough as clearly shown in Figure 6 and are normally pushed downwardly by springs 42. When the valve rods are in their lowered positions they are in register with the respective air pipes 24 and 25 and passages 43 which lead into the air pressure cylinder. When the valve rods are raised, the holes 41 register with the respective openings 30 and 31 and with passages 44 which lead outwardly from the interior of the pressure cylinder 22.

In the operation of my invention, for example as illustrated in the position shown in Figure 2, the compressed air enters the air pressure cylinder 22 through the medium of the pipe 24, hole 40 and passage 43. This air moves the piston 23 toward the opposite end of the cylinder; it being noted that the lever 32 is held with the magnetic disk 34 in magnetic engagement with the disk 36 until the bar 39 operates upon the opposite end of the strip spring 38, after which the lever 32 will be rocked so that the disk 35 will push the valve rod 29 upwardly and the valve rod 28 will be released and moved downwardly by the action of its spring 42.

When the valve rod 29 has thus been raised, it will permit compressed air to enter the pressure cylinder 22 through the medium of the pipe 25, hole 40 and passage 43 of the valve casing 27, and the piston 23 will move in an opposite direction. It will thus be understood that the magnetic disks 34 and 35 serve to hold the respective valve rods in their raised position during the travel of the bar 39 between the bowed portions of the spring 38 so that the air will continue to enter the cylinder 22 until the piston 23 has nearly reached the end of the cylinder in either direction of travel. It will be further noted that when the valve rods are moved downwardly that they cause the holes 41 therein to permit escape of the air from the cylinder 22.

Having thus described my invention, what I claim as new and desire to secure by Letters Patent is:

1. Mechanism of the character described including a valve; means movable to operate said valve and having a magnetized portion; means providing a part adapted to co-act with said magnetized portion so that the magnetic attraction between said part and said magnetized portion will serve to retain said valve in its moved position; and means operative to separate said magnetized portion from said part to effect the movement of said valve into another position; substantially as described.

2. Mechanism of the character described including a fluid pressure cylinder; a piston mounted within said cylinder; an actuating member operatively connected to said piston and extending out of said cylinder; valve casings; valves within said casings, each of said casings having two passages communicating with the interior of said pressure cylinder; valve rods within said casings and having portions adapted to project therefrom; a pivoted lever; magnetized members on said lever; portions on said casings adapted to attract said magnetized members; and means operative in conjunction with said piston connected member for alternately swinging said lever to cause said magnetized members to be moved into position to be held to said portion of the casing due to the magnetic qualities thereof and to lift and hold said valve rods in their inward positions, said valve rods when moved in posite directions serving to alternately open and close the passages of said valve casings, whereby pressure fluid is alternately admitted into opposite ends of the pressure cylinder so as to reciprocate its piston and thereby cause the reciprocation of said actuating member; substantially as described.

3. Mechanism of the character described including two valves adapted to be alternately moved; means including magnetized portions adapted to alternately move said valves from one position into another; means providing parts adapted to co-act magnetically with said magnetized portions whereby the magnetic attraction of said portions for said parts cause the valves to remain in their positions into which they are moved by said first means, and means for moving said first means to alternately release said respective portions and parts to effect the movement of said valves in the other positions; substantially as described.

4. Mechanism of the character described including a valve; means movable to operate said valve; magnetic co-acting portions, one which is attached to said first means; and means operative to move said first means to actuate said valve and to move said latter magnetically co-acting portion toward the other co-acting portion so that said portions will be kept, due to magnetism, in a position keeping the valve in its actuating position; substantially as described.

5. Mechanism of the character described including a valve; means movable to operate said valve; magnetic co-acting portions, one of which is attached to said first means; means operative to move said first means to actuate said valve and to move said latter magnetically co-acting portion into such position toward the other co-acting portion so that said portions will be kept, due to magnetism, in a position keeping the valve in its actuating position; and means for moving said first means to effect separation of said portions to allow movement of said valve out of said position; substantially as described.

6. Mechanism of the character described including a valve; means movable to operate said valve; magnetic co-acting portions, one of which is attached to and forms a part of said first mentioned means; and means operative to move said latter co-acting portion into a raised position toward the other co-acting portion whereby such portions will be kept, due to magnetism, in a position to keep the valve at one limit of its movement until released; substantially as described.

7. Mechanism of the character described including a plurality of valves spaced apart, means movable to operate said valves alternately, said valves being normally held in one position; magnetic co-acting portions, certain of which are carried by the first mentioned means adjacent to the valves of co-acting magnetic portions; and means operative to move said first mentioned means intermittently to cause the magnetic portions thereof to move toward and be attracted to the co-acting portions of the valves to actuate said valves whereby opposite valves are held in opposite positions and retained in such positions by the magnetism between the co-acting portions attracted to each other, said last mentioned means serving in another position to move the first mentioned means to effect separation of the attracted magnetic portions and to move the other magnetic portions carried by the first mentioned means into position to be attracted; substantially as described.

In testimony whereof I have signed my name to this specification in the presence of two subscribing witnesses.

PATRICK H. CALLAGHAN.

Witnesses:
 Mrs. Leila Callaghan,
 Francis J. Callaghan.